(12) United States Patent
Kühr

(10) Patent No.: US 8,863,916 B2
(45) Date of Patent: Oct. 21, 2014

(54) BRAKE SHOE FOR DRUM BRAKE

(75) Inventor: Kai Kühr, Osnabrück (DE)

(73) Assignee: Saf-Holland GmbH, Bessenbach (DE)

( * ) Notice: Subject to any disclaimer, the term of this patent is extended or adjusted under 35 U.S.C. 154(b) by 174 days.

(21) Appl. No.: 13/365,906

(22) Filed: Feb. 3, 2012

(65) Prior Publication Data

US 2012/0199427 A1 Aug. 9, 2012

(30) Foreign Application Priority Data

Feb. 7, 2011 (DE) .................. 10 2011 003 721

(51) Int. Cl.
*F16D 65/04* (2006.01)
*F16D 65/08* (2006.01)

(52) U.S. Cl.
CPC ...................................... *F16D 65/08* (2013.01)
USPC ................ 188/250 R; 188/250 B; 188/250 C

(58) Field of Classification Search
USPC ...... 188/218 R, 250 R, 250 B, 250 C, 250 G, 188/250 D
See application file for complete search history.

(56) References Cited

U.S. PATENT DOCUMENTS

| | | | |
|---|---|---|---|
| 1,862,124 A * | 6/1932 | Skelton ...................... | 188/251 R |
| 2,139,409 A * | 12/1938 | Saxton ........................ | 188/234 |
| 3,176,804 A | 4/1965 | Erickson | |
| 3,650,360 A | 3/1972 | King et al. | |
| 5,839,550 A * | 11/1998 | Redgrave et al. .......... | 188/250 D |
| 5,941,349 A * | 8/1999 | Krumm, Sr. ............... | 188/250 G |
| 5,975,255 A * | 11/1999 | Monroe et al. ............ | 188/250 D |
| 8,261,890 B2 * | 9/2012 | Paynter et al. ............. | 188/250 B |

FOREIGN PATENT DOCUMENTS

| | | |
|---|---|---|
| CA | 2542346 | 4/2005 |
| DE | 7501096 | 5/1975 |
| DE | 19602061 | 7/1997 |
| DE | 69033567 | 3/2001 |
| GB | 371834 | 4/1932 |
| GB | 397874 | 8/1933 |
| GB | 2087995 | 6/1982 |
| GB | 2191834 | 12/1987 |
| WO | 2008/070997 | 6/2008 |

\* cited by examiner

*Primary Examiner* — Melanie Torres Williams
(74) *Attorney, Agent, or Firm* — Price Heneveld LLP

(57) ABSTRACT

A brake shoe, in particular a brake shoe for a drum brake, comprising a bridge unit and a brake pad unit, wherein the bridge unit comprises a bridge element with an at least partially arched geometry and a bridge-sided connecting portion, the brake pad unit comprises a brake-pad-sided connecting portion, and the brake-pad-sided connecting portion and the bridge-sided connecting portion are configured such that they positively engage each other at least in a certain area so that the positive engagement prevents, in at least one direction, the brake pad unit dislocating relative to the bridge element.

9 Claims, 4 Drawing Sheets

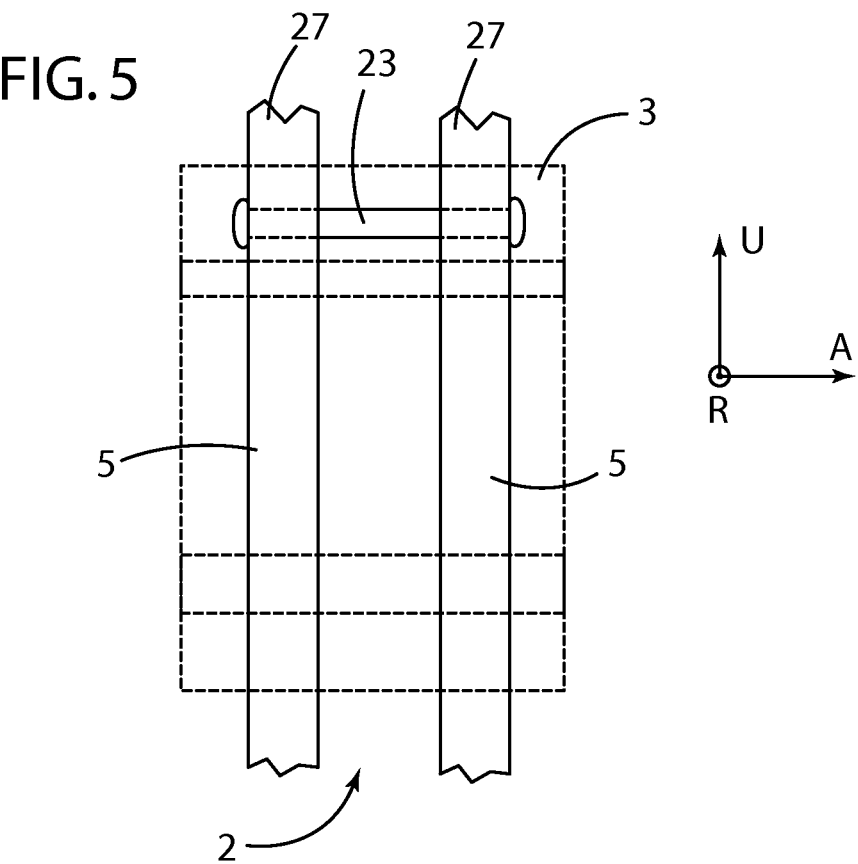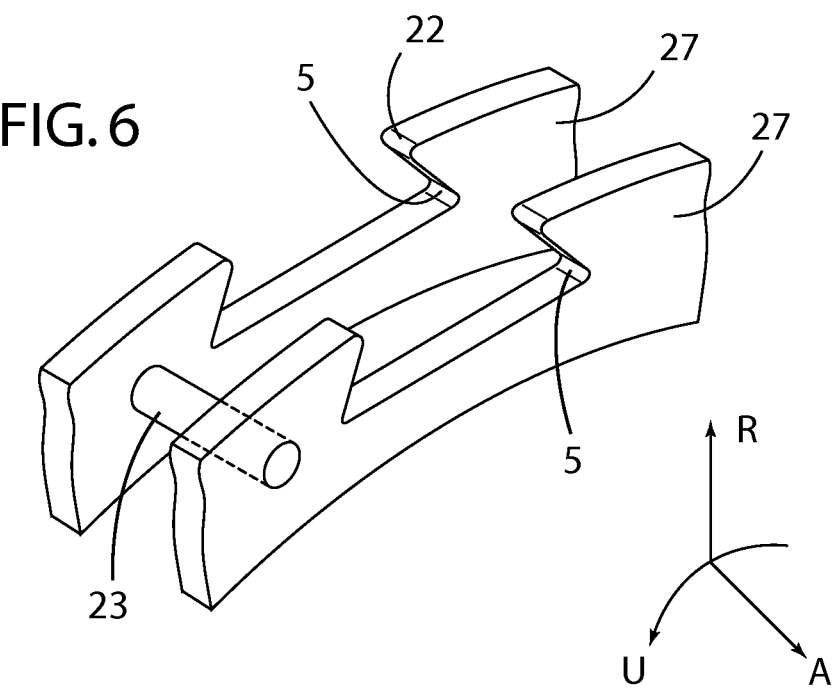

BRAKE SHOE FOR DRUM BRAKE

CROSS REFERENCE TO RELATED APPLICATIONS

This application claims priority under 35 U.S.C. §119 to German patent application DE 10 2011 003 721.7, filed Feb. 7, 2011.

FIELD OF THE INVENTION

The present invention relates to a brake shoe for a drum brake, in particular for use in motor vehicles and commercial vehicles.

BACKGROUND OF THE INVENTION

Brake shoes are well-known in the prior art. For example, DE 196 02 061 A1 discloses a brake shoe for a drum brake comprising a brake band supporting a brake lining and a substantially inward protruding fixture arm attached to said brake band, wherein the brake band and the brake bridge are manufactured in a casting process which requires little finishing. In the hitherto known brake shoes for drum brakes, the brake lining is unreleasably connected to the brake bridge—mostly by means of intermediary elements such as support plates or brake bands—and, in the case of damage or when the wear limit of the brake linings has been reached, the entire brake shoe has to be replaced. This does not only require tremendous assembly efforts but also increases material consumption and, consequently, leads to very high costs since in the case of damage or when the useful life limit of a component has been reached, the components connected thereto, which might still be intact, also have to be disassembled and disposed of.

Therefore, the object underlying the present invention is to provide a brake shoe, wherein it is possible to easily replace individual components or assembly groups of the brake shoe so that it is not necessary to dispose of the entire brake shoe in the case of damage.

SUMMARY OF THE INVENTION

According to the invention there is provided a brake shoe, in particular a brake shoe for a drum brake. The brake shoe comprises a bridge unit and a brake pad unit, wherein the bridge unit comprises a bridge element with an at least partially arched geometry and the bridge element comprises at least a bridge-sided connecting portion, and wherein the brake pad unit comprises a brake-pad-sided connecting portion. The brake-pad-sided connecting portion and the bridge-sided connecting portion are configured such that they positively engage each other at least in a certain area so that the positive engagement or locking prevents the brake pad unit from dislocating relative to the bridge element in at least one direction.

Thus, the brake shoe consists of the main assembly groups of bridge unit and brake pad unit. Here, the bridge unit primarily serves to spatially fix the brake pad unit and to transmit forces thereto in certain directions or to absorb forces therefrom. The bridge unit comprises at least a bridge element, wherein the bridge element has an arched geometry on at least one side. Preferably, the bridge element is flat and plate-like, i.e. in one of its main extension directions the material thickness is thin relative to the other two directions. In particular, the arched geometry may be an outwardly arched, convex cutting edge of the plate-like bridge element. Here, the cutting edge may be circular and/or elliptical, preferably as a whole or only partially.

Particularly preferably, the bridge unit comprises two bridge elements, which expediently have similar or congruent dimensions. The bridge elements preferably are oriented parallel to each other, i.e. the surfaces of the bridge elements spanned by the two main extension directions with great material thickness are parallel to each other. Furthermore, it is preferred that the geometry of the bridge elements is aligned, when seen perpendicular to the parallel surfaces. The distance between the bridge elements is preferably determined by the dimensions of the brake pad unit to be supported by them and may be adjusted by means of transverse supports.

The transverse supports are preferably arranged perpendicular to the parallel surfaces, between the bridge elements and firmly connected to them. Preferably, to this end there are provided bores in the bridge elements, into which the transverse supports may engage. The transverse supports expediently have a cylindrical geometry and moldings at their ends in which the bridge elements are held. Preferably, nuts, bolts, bushes, pins, rivets or any combination of said elements, preferably made from metal such as steel, are used as transverse supports.

A preferred material of manufacture of the bridge elements is metal. Furthermore, it is also possible to use a light metal such as aluminum or titanium, plastics or a ceramic, fiber-reinforced material.

According to the invention the brake pad unit is attached to the at least one bridge element and secured in at least one direction against dislocation relative to the bridge element by means of positive engagement or locking. The direction in which dislocation preferably has to be prevented is that direction in which a braking force acts on the brake pad unit and in which the brake pad unit transmits said force to the at least one bridge element.

In order that the brake pad unit may particularly well absorb the braking force, there is provided on its outwardly directed side, i.e. the side facing away from the bridge element, a surface particularly enhancing friction or a friction lining. Preferably, to this end, the brake pad unit comprises at least one lining element, in particular a brake lining element, which has a particularly high coefficient of friction, good temperature resistance and sufficient mechanical strength and toughness to transmit the forces absorbed by it. In order to accommodate the brake lining element the brake pad unit further comprises a support element on which the at least one brake lining element is attached.

Particularly preferably, the brake lining element is attached on the support element by means of a non-releasable positive connection, for example by means of rivets. In a further preferred embodiment the brake lining element may be attached to the support element by material bonding, for example by means of an adhesive or by soldering/brazing, or by a non-positive or friction-locked connection. In a further preferred embodiment the brake lining element, at the side facing towards the support element, comprises moldings which engage bores provided in the support element so as to fix the brake lining element to the support element. Said moldings may be cylindrical pins, for example, which engage cylindrical bores in the support element.

Preferably, there may be provided a plastically easily deformable area on the cylindrical pins, which forms a positive connection with an undercut provided in the bore when the pin is pushed into the bore. Thanks to this embodiment, the use of rivets, which were hitherto required in order to attach the brake lining element on the support element, can be avoided because it is possible to easily attach the brake lining element on the support element without additional machinery being required.

In all preferred embodiments it is important that the brake lining element is secured against dislocation relative to the support element and that the type of connection chosen withstands the high temperatures and forces acting on the brake lining element and the support element.

Along the arched geometry of each bridge element there is provided according to the invention at least one bridge-sided connecting portion for positively connecting the bridge elements to the at least one brake pad unit. Preferably, a plurality of brake pad units, however particularly preferably three brake pad units, are attached to the bridge unit along the arched side of the bridge element. To this end, the bridge element comprises a corresponding number of connecting portions, and particularly preferably three connecting portions.

In a preferred embodiment the positive engagement between the brake pad unit and the bridge unit is releasable such that the assembly of the brake pad unit and the bridge unit may be disassembled. This means in particular that the brake pad unit may be separated from the bridge unit and that, to this end, it is not necessary to use work-intensive operations to undo a material bonding or a non-positive connection. By implication, no material bonding or non-positive connection has to be directly provided in order to mount the brake pad unit on the bridge unit. Thus, it is possible to avoid process steps such as mechanical separation processes, for example machining or cutting, and thermal joining and separation processes, for example welding, brazing/soldering, flame cutting or jet cutting, when making or releasing the connection between the brake pad unit and the bridge unit. Thus, it becomes possible to easily take away individual brake pad units and/or to add new brake pad units. Assembly and repair costs for brake systems of the type described may be drastically decreased in this way. As a matter of course, despite the possibility of easy assembly and disassembly, the positive engagement, i.e. the positive connection, between the brake pad unit and the bridge unit is configured such that the functioning of the brake shoe, i.e. the transmission of force from the brake pad unit to the bridge unit, is not limited in any way.

In a further preferred embodiment the positive connection between the brake pad unit and the bridge unit is made by means of at least one pairing of the brake-pad-sided connecting portion and a recess at the bridge-sided connecting portion, wherein the geometry of the brake-pad-sided connecting portion is congruent with the geometry of the recess at least in a certain area. Preferably, at the bridge element there is provided a recess which is suitable to accommodate the brake-pad-sided connecting portion and to secure it in at least one direction against dislocation. Preferably, the recess is a simple cavity in the material, which cavity is at least partially congruent with the geometry of the cross-section of the lower part of the brake pad unit, i.e. the part facing towards the bridge element.

Particularly preferably, the positive connection between the brake pad unit and the bridge unit is formed by at least one paring of a recess with a projection, wherein the geometry of the respective recess at least in a certain area is congruent with the geometry of the corresponding projection. Apart from a recess at one of the two connecting portions there is provided in this preferred embodiment a projection at the respective other connecting portion. Here, the geometry of the projection, at least in a certain area, is congruent with the geometry of the recess which it engages.

Preferred cross-sections for the projection and the corresponding recess are rectangular. Preferably, there are also provided several projections and/or recesses at one connecting portion, which, paired with several respective moldings on the opposite connecting portion, form several positive connections between the brake pad unit and the bridge element. Here, the number, size and special cross-sectional geometry of the projections and recesses is preferably meant to lead to advantageous properties in terms of structural mechanics, for example by achieving a favorable flow of force from the brake pad unit to the bridge unit by avoiding stress peaks due to notching effects.

Preferably, there may be provided a plurality of very small adjacent projections and recesses which engage each other in order to keep the connecting portions on the brake pad unit and bridge unit as flat as possible. In a preferred embodiment there is provided one or a plurality of recesses on the brake-pad-sided connecting portion, wherein the brake pad unit, which potentially is the component which has to be replaced most often, is configured in such a manner that material is saved, while the bridge unit comprises one or several projections, respectively, in its bridge-sided connecting portions. Additionally or alternatively, there is provided one or a plurality of recesses at the bridge-sided connecting portion. Preferably, in the case of several bridge elements arranged adjacent to each other, there are provided on the brake pad elements a corresponding number of projections or recesses or continuously in the transverse direction, i.e. the direction connecting the bridge elements.

In an advantageous embodiment the projection and the corresponding recess have a cross-section which remains constant along a first direction, so that it is possible to insert the projection into the corresponding recess and to withdraw it therefrom in said direction. The first direction is defined as that direction which lies in space perpendicular to the circumferential direction and perpendicular to the radial direction of the arched geometry of the bridge elements. Said direction may also be referred to as axial direction since, in a wider context, it corresponds to the axial direction of a vehicle axis or of a rotating vehicle hub to which the brake drum and the brake shoe contained therein are connected. In the axial direction, the cross-sections of the projections and recesses should preferably be constant so that a dislocation of a projection relative to the corresponding recess is not impeded in this direction. In this way, it is possible to laterally withdraw the brake pad elements of the brake shoe, preferably while the brake shoe is still mounted on the vehicle axle. Fixing in the axial direction may be done for example by inserting splints, pins or similar positively or non-positively locking securing elements in the bores provided to this end on the brake pad unit. Preferably, said elements are easy to insert and withdraw so that the assembly effort is kept as low as possible.

In a preferred embodiment the recess comprises an undercut along a second direction, wherein the projection has a geometry which preferably positively engages said undercut so that the brake pad unit is secured in the second direction against dislocation relative to the bridge unit. The second direction is defined as the radial direction since it corresponds to the radial direction of the arched geometry of the bridge elements or the radial direction of the rotating vehicle hub. In this direction, there is chosen an undercut, that is a cross-sectional geometry of a recess and a projection engaging said recess, such that the projection cannot dislocate in said direction relative to the recess. The variety of shapes which may be chosen for this undercut is almost unlimited because only a narrowing cross-section is required, however, dovetailed, trapezoidal or L-shaped cross-sections, for example, are preferred. Preferably, said cross-sections are kept constant in the axial direction, as a result of which the degree of freedom of the brake pad unit relative to the bridge unit is limited to translation in the axial direction. Preferably, the brake pad can be inserted into said cross-section along said axial direction from both sides of said bridge elements. By this means, the same geometry of said bridge elements and said brake pads can be used on both sides of the motor vehicle, respectively commercial vehicle, wherein said brake pads can be inserted in or removed from said bridge elements from the respective side of said vehicle.

In a preferred embodiment the recess and the projection have axis-symmetric cross-sections. Preferably, in the case of constant cross-sections of the projections and recesses in the axial direction it is advantageous to design the cross-sections to be symmetric to the radial direction as the axis of symmetry. In this particularly preferred embodiment, individual brake pad units, which for example are worn on one side only, may be withdrawn and re-inserted side-inverted. Furthermore, uniform brake pad units may be used on both vehicle sides and be interchanged.

Further expediently, a fixing element additionally connects the brake pad unit and the bridge unit. Here, the fixing element may preferably secure the brake pad unit against dislocation in the radial direction, particularly preferably when the connecting portions on the brake pad unit and on the bridge unit do not have an undercut. Because it is expected that only small forces will act in the radial direction, which forces push the brake pad unit away from the bridge unit, preferably the fixing element may introduce small forces between the brake pad unit and the bridge unit. Said forces preferably are sufficient to fix the brake pad unit and sufficiently small to make it possible to easily assemble and disassemble the fixing elements. A particularly preferred embodiment is a fixing element designed as a spring or spring leaf which is arranged under pre-tension between a transverse support and a brake pad unit, wherein its two ends are angled and hook onto the brake pad unit, and its central portion is arched over the transverse support which, in turn, is connected to the bridge elements. A preferred material of manufacture for said fixing element is spring steel, for example. In further preferred embodiments it is also possible to provide pins, spring rings, bolts, nuts or latch devices as fixing elements.

Further according to the invention there is provided a method of manufacturing a brake shoe, wherein a bridge unit, comprising a bridge element with an at least partially arched geometry and at least a bridge-sided connecting portion, and a brake pad unit, comprising a brake-pad-sided connecting portion are provided, and subsequently the bridge unit and the brake pad unit are joined such that between the bridge-sided connecting portion and the brake-pad-sided connecting portion there is a positive connection. The particularly simple and time-saving method of manufacture preferably only includes attaching one or several brake pad units at the bridge-sided connecting portions provided to this end by means of a positive connection. Additionally, the brake pad units may be fixed on the bridge units by a plurality of fixing elements. The method according to the invention is characterized in that it is not necessary to provide a material bonding or a non-positive connection between the brake pad unit and the bridge unit and that, by implication, the brake pad units may be easily disassembled from the bridge unit without having to undo a material bonding or non-positive connections beforehand.

In a preferred embodiment of the method a first connecting portion may comprise a recess, wherein a second connecting portion positively engaging the recess has an oversize relative to the recess, and wherein the component comprising the recess in the heated state is brought together with the component comprising the second connecting portion so that, after the component comprising the recess has cooled down, apart from the material bonding there is also a non-positive connection between the recess and the projection. In this preferred embodiment of the method according to the invention, which up to now only comprises a positive connection between the brake pad unit and the bridge unit, said positive connection is enhanced and reinforced by a non-positive connection. This may be advantageous with regard to safety issues, in particular in the field of vehicle braking systems, since it is thus ensured that the brake pad unit is additionally fixed on the bridge unit. However, also for this preferred embodiment it is possible to carry out the assembly and disassembly operations with comparatively little effort, for example by using pointwise or selective heating of individual components by means of induction, and the thus heated components may be assembled and separated as easily as ever. Also the oversize of the connecting portion engaging the recess may be kept so small that the required heating temperature for joining is low, and the components can be separated by manually applied forces.

As a matter of course, all further advantages and features of the brake shoe for a drum brake according to the invention may also be found in the method of manufacturing said brake shoe.

Further advantages and features result from the following exemplary description of a preferred embodiment of the brake shoe for a drum brake according to the invention with reference to the appended Figures. Different features of different embodiments may be combined within the framework of the present invention.

BRIEF DESCRIPTION OF THE DRAWINGS

The Figures show:

FIG. 5 is a view of an embodiment of the bridge unit, wherein the brake pad unit is indicated by means of dashed lines, and FIG. 6 is a perspective view of an embodiment of the bridge unit.

DETAILED DESCRIPTION

Figure 1:
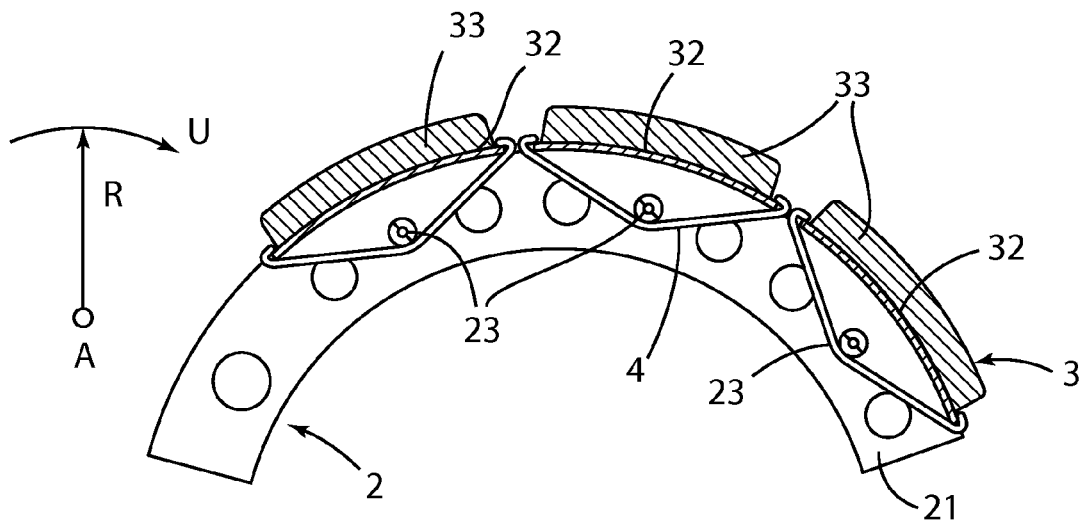
FIG. 1 is a first cross-sectional view of an embodiment of the brake shoe for a drum brake according to the invention.

In the embodiment of a brake shoe for a drum brake shown in FIG. 1, three brake pad units 3 are distributed along a bridge unit 2 in the circumferential direction U. The spatial coordinate system used in this and the following Figures corresponds to a cylinder coordinate system with the axes A—the axial direction, U—the circumferential direction, and R—the radial direction. In FIG. 1, the axial direction A is the viewing direction towards the brake shoe. In the embodiment shown in FIG. 1 the bridge unit 2 comprises two bridge elements 21—one of which is not shown since it lies above the sectional plane of this sectional view—and three transverse supports 23. The bridge elements 21 have a circular rounded geometry and comprise at their outwardly directed side bridge-sided connecting portions 22 (not shown in FIG. 1) at which the brake pad elements 3 are arranged and wherein a brake-pad-sided connecting portion 31 (not shown in FIG. 1) located at their inwardly directed side at least in a certain area positively engages the corresponding bridge-sided connecting portion 22. The number of bridge-sided connecting portions 22 expediently is identical to the number of brake pad units 3 provided. In the preferred embodiment shown each brake pad unit 3 comprises a support element 32 and a brake lining element 33 attached at its outwardly directed side, wherein the brake lining element 33 is connected to the support element 32 by means of material bonding, e.g. by an adhesive bond using an epoxy resin, or by means of a positive connection, e.g. by means of a rivet connection. Furthermore, in this preferred embodiment there are provided three fixing elements 4 which, supporting on the transverse supports 23, each push a brake pad unit 3 in the radial direction against the bridge elements 21. To this end, the fixing elements 4 comprise a hook-shaped geometry at their ends which latches at the two sides of a brake pad unit 3, in this embodiment at the two sides of the support element 32—which laterally extends beyond the brake lining element 33. As is shown in FIG. 1, the outer surfaces of the bridge elements 21 and of the brake pad units 3 are preferably arranged concentrically with respect to each other, and they have a circular geometry.

Figure 2:
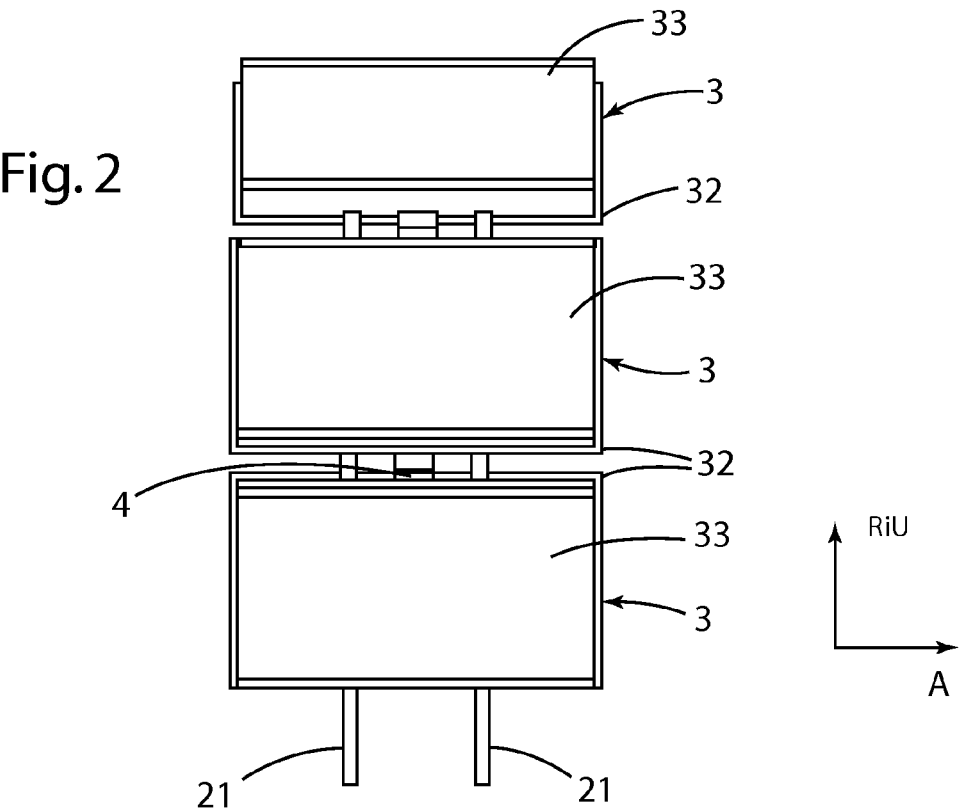
FIG. 2 is a top plan view of an embodiment of the brake shoe according to the invention.

FIG. 2 is a top plan view of a preferred embodiment of the brake shoe. Here, the bridge elements 21 are shown along their thin-walled side, wherein, with respect to FIG. 1, the plate-shaped geometry of the bridge elements 21 is clearly visible. It can be further seen that the bridge elements 21 are spaced apart and preferably arranged parallel to each other. This results in a particularly stable support of the brake pad units 3 attached to the bridge elements 21, wherein the distance between the bridge elements 21 should be chosen such that it is sufficiently large to ensure that the brake pad units 3 are safely supported, however, such that it does not exceed the extension thereof in the axial direction A. Furthermore, there is shown the preferred rectangular shape of the brake pad units 3, wherein each comprises a support element 32 and a brake lining element 33—which is located above in FIG. 2. At the lateral edges of the brake pad units 3, which are oriented in the circumferential direction U, the hook-shaped ends of the fixing elements 4 can be seen, which keep the brake pad units pushed against the bridge elements towards the inside in the radial direction A.

Figure 3:
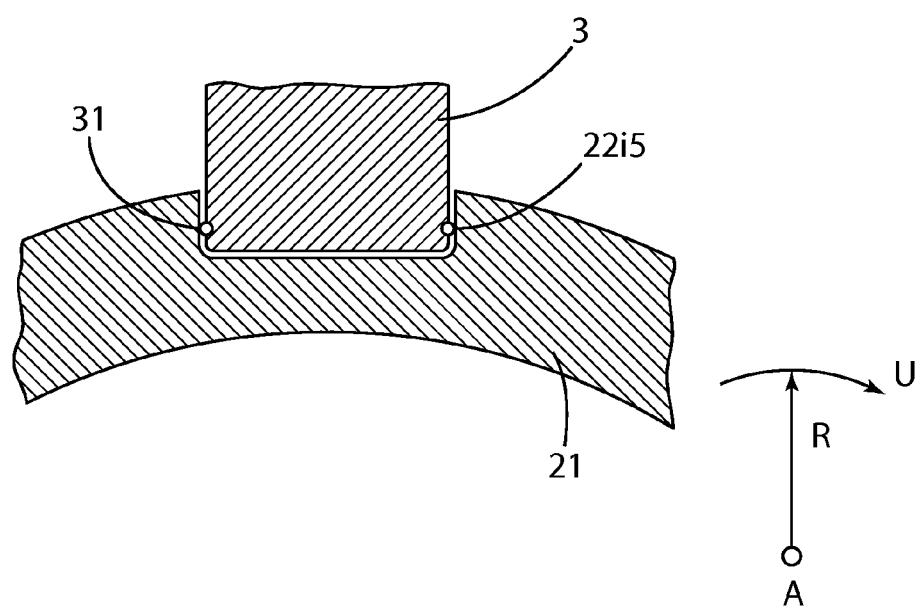
FIG. 3 is a cross-sectional view of an embodiment of the bridge-sided connecting portion and of the brake-pad-sided connection portion, FIGS. 4 a) to d) are four further cross-sectional views of additional embodiments of the bridge-sided connecting portion and of the brake-pad-sided connecting portion.

FIG. 3 depicts a first sectional view of a preferred embodiment of the positive connection between a bridge element 21 and a brake pad unit 3. Here, there is provided at the underside of the brake pad unit 3 a brake-pad-sided connecting portion 31, which preferably at least in a certain area positively engages a bridge-sided connecting portion 22 at the outwardly directed side of the bridge element 21. In this embodiment, the bridge-sided connecting portion 22 is a recess 5, to simplify it a cavity in the material of the bridge element 21, which is suitable to secure the brake-pad-sided connecting portion 31 and, connected thereto, the entire brake pad unit 3 against dislocation in the circumferential direction U. In the embodiment shown, the brake pad unit 3 optionally may be inserted with its brake-pad-sided connecting portion 31 into the bridge-sided connecting portion 22 in the radial direction R or in the axial direction A, wherein it is a prerequisite that the cross-section of the two connecting portions 22 and 31 is constant in the axial direction A.

Figure 4A:
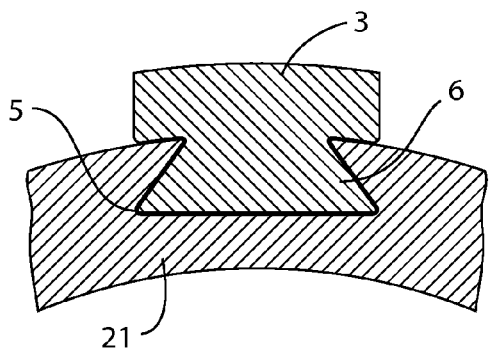
Figure 4B:
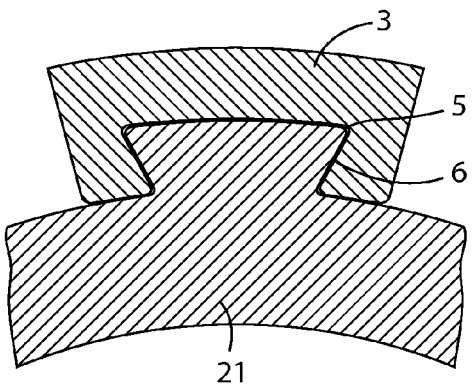
Figure 4C:
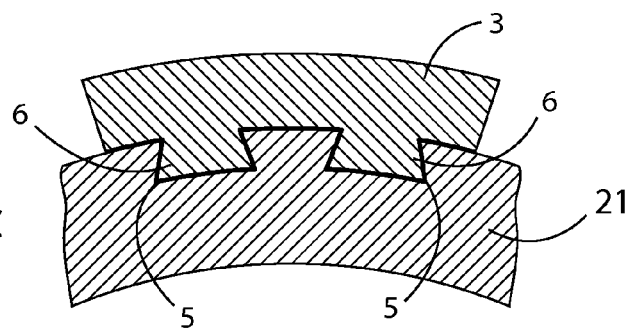
Figure 4D:
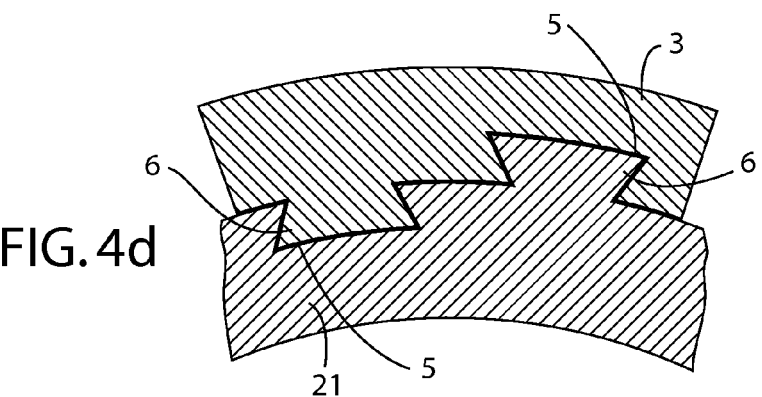

FIGS. 4a) to 4d) show four preferred embodiments of the bridge-sided connecting portion 22 and of the brake-pad-sided connecting portion 31. It is a common feature of all four embodiments that each positive connection between the brake pad unit 3 and the bridge element 21 is made by at least one pairing of a recess 5 and of a projection 6 and that the cross-sectional geometry of the recess 5 comprises an undercut in the radial direction R. Said undercut, together with the at least partially congruous geometry of the engaging projection 6, lead to the fact that the brake pad unit 3 is secured against dislocation relative to the bridge element not only in the circumferential direction U but also in the radial direction R. In FIG. 4a), the bridge element 21 comprises a recess 5 and the brake pad unit comprises a projection 6, wherein the cross-sectional geometry of both the projection 6 and of the recess 5 is dovetail-like. In the embodiment shown in FIG. 4b) the bridge element 21 comprises a projection 6 and the brake pad unit 3 comprises a recess 5, also both having a dovetail-like cross-section. It is an advantage of this embodiment that for the brake pad unit 3 compared to the embodiment shown in FIG. 4a) there is needed less material of manufacture, which may be cost-efficient with regard to the replacement of brake pad units 3. FIG. 4c) shows a preferred embodiment in which a brake pad unit 3 is connected via two projections 6 into the two recesses 5 provided on the bridge element 21. This embodiment may be particularly advantageous in the case of brake pad units 3 with a large extension in the circumferential direction U since the larger forces absorbed by the larger brake pad unit 3 may be transmitted and distributed to a plurality of connecting portion pairings. In the preferred embodiment shown in FIG. 4c) the brake pad unit 3 may also be attached to the bridge element 21 in a side-inverted manner as long as the geometry of the two connection pairs is congruent. FIG. 4d) shows a preferred embodiment in which both the brake pad unit 3 and the bridge element 21 each comprise a recess 5 and a projection 6. The advantage also of this embodiment is that it is possible to transmit larger forces, wherein the brake pad unit 3 in this embodiment may be attached to the bridge element 21 in one direction only. This may be particularly beneficial when the brake lining elements 33 have a main direction with the highest possible coefficient of friction and, consequently, the brake pad units should be arranged in said main direction. As a matter of course, there may also be provided three or more connection pairings, which exceed what is shown in the examples described here.

FIG. 5 is a view of the bridge unit 2 from the radial direction. In the embodiment shown, the bridge unit 2 comprises two bridge elements 21 which are connected to one another via a transverse support 23 and which are simultaneously spaced apart by said transverse support 23. In this preferred embodiment the transverse support 23 comprises two rivet-like ends, which have a larger diameter than the bores in the bridge elements 21 and, thus, secure the two bridge elements 21 against dislocation away from each other by means of a positive connection. On the top of each of the two bridge elements 21 there is indicated a recess 5 into which the brake pad unit 3 shown by the dashed lines is introduced.

Finally, FIG. 6 is a perspective view of the bridge element 2, comprising two bridge elements 21, a transverse support 23 between the bridge elements 21, and a bridge-sided connecting portion 22, which is designed as a recess 5 with undercut. It is shown in dashed lines that the recesses 5 at the two bridge elements 21 are particularly preferably oriented to each other in the axial direction A in such a manner that they are aligned.

The invention claimed is:
1. A method of manufacturing a brake shoe, comprising the following steps:
(a) providing a bridge unit comprising a bridge element with an at least partially arched geometry, and a bridge connecting portion;

(b) providing a brake pad unit comprising a brake pad connecting portion, wherein a first connecting portion, which is one of the bridge connecting portion and the brake pad connecting portion, comprises a recess having a first cross sectional area, and wherein a second connecting portion, which is the other of the bridge connecting portion and the brake pad connecting portion, comprises a projection which has a second cross sectional area which is larger than the first cross sectional area; and (c) joining the bridge unit and the brake pad unit by positively engaging the bridge connecting portion and the brake pad connecting portion, wherein the first connecting portion is heated prior to engagement with the second connecting portion, wherein after the first connecting portion has cooled, there is a friction-fit engagement between the first connecting portion and the second connecting portion.

2. The method of claim 1, wherein the bridge unit and the brake pad unit at least partially positively engage the bridge connecting portion and the brake pad connecting portion to prevent movement of the brake pad unit relative to the bridge element in at least one direction.

3. The method of claim 1, wherein the positive engagement of the brake pad unit and the bridge unit is releasable allowing disassembly of the brake pad unit from the bridge unit.

4. The method of claim 1, wherein the positive engagement between the brake pad unit and the bridge unit is formed by a portion of the brake pad connecting portion which is congruently shaped with a recess on the bridge connecting portion.

5. The method of claim 1, wherein the positive engagement between the brake pad unit and the bridge unit is formed by at least one pairing of a recess with a projection, and wherein the recess and the projection are at least partially congruently shaped.

6. The method of claim 5, wherein the congruent portions of the projection and the recess each have a cross-section which remains constant along a first direction so that it is possible to insert the projection into the corresponding recess and to withdraw it therefrom by translational motion along said first direction.

7. The method of claim 6, wherein the recess comprises an undercut along a second direction, and wherein the projection is congruently shaped with the undercut to positively engage the undercut and secure the brake pad unit from dislocation relative to the bridge unit in the second direction.

8. The method of claim 7, wherein each of the recess and the projection have an axis-symmetric cross-section.

9. The method of claim 1, further comprising:
providing a fixing element that connects the brake pad unit and the bridge unit.

* * * * *